United States Patent [19]

Wasner

[11] Patent Number: 4,773,811
[45] Date of Patent: Sep. 27, 1988

[54] APPARATUS FOR DOCKING OF A CARRIER ELEMENT FORMING A SUPPORT PLANE ONTO A STATIONARY SUPPORT PLANE

[75] Inventor: Herbert Wasner, Munich, Fed. Rep. of Germany

[73] Assignee: Friedrich Kessler & Co., Grafelfing, Fed. Rep. of Germany

[21] Appl. No.: 897,395
[22] PCT Filed: Nov. 19, 1985
[86] PCT No.: PCT/EP85/00628
§ 371 Date: Jul. 28, 1986
§ 102(e) Date: Jul. 28, 1986
[87] PCT Pub. No.: WO86/03179
PCT Pub. Date: Jun. 5, 1986

[30] Foreign Application Priority Data

Nov. 28, 1984 [DE] Fed. Rep. of Germany ....... 3443409
Jan. 23, 1985 [DE] Fed. Rep. of Germany ....... 3502158
Feb. 13, 1985 [DE] Fed. Rep. of Germany ....... 3504929

[51] Int. Cl.⁴ .......................... B23Q 7/14; B65G 1/04
[52] U.S. Cl. ...................................... 414/401; 414/396
[58] Field of Search ............... 414/401, 402, 391, 396, 414/584, 786

[56] References Cited

U.S. PATENT DOCUMENTS

| 1,276,674 | 8/1918 | Mentzer et al. | 414/396 |
| 2,120,042 | 6/1938 | Remde | 414/396 X |
| 4,199,289 | 4/1980 | Segbert et al. | 414/401 X |
| 4,394,888 | 7/1983 | Clarke | 414/396 X |
| 4,435,250 | 3/1984 | Lindgren | 414/401 X |
| 4,544,322 | 10/1985 | Booker | 414/401 X |
| 4,597,709 | 7/1986 | Yonezawa | 414/401 |
| 4,655,667 | 4/1987 | Plumb et al. | 414/401 X |
| 4,662,809 | 5/1987 | Sturtz et al. | 414/401 X |
| 4,671,728 | 6/1987 | Clark et al. | 414/401 |

FOREIGN PATENT DOCUMENTS

| 7835449 | 3/1979 | Fed. Rep. of Germany. |
| 3101661 | 11/1984 | Fed. Rep. of Germany. |
| 3316050 | 11/1984 | Fed. Rep. of Germany. |
| 3345877 | 6/1985 | Fed. Rep. of Germany. |

Primary Examiner—Joseph E. Valenza
Assistant Examiner—David A. Bucci
Attorney, Agent, or Firm—Herbert Dubno

[57] ABSTRACT

A transport carriage has a carrier element forming a support plane for the purpose of receiving pallets. In order to bring the carrier element, for the purpose of transferring the pallet onto a stationary support plane in a stationary stand or the like, into the same plane as the latter, and fix it in the correct position, the carrier element is wheeled to the stand in a raised position, is supported by being lowered, guided in geometrically exact manner, on its standside edge onto two stationary points formed by two locating lugs provided on stand which lie in a straight line parallel to the stationary support plane, and which is then lifted by the opposite edge by means of a lifting element into the common transfer plane.

14 Claims, 10 Drawing Sheets

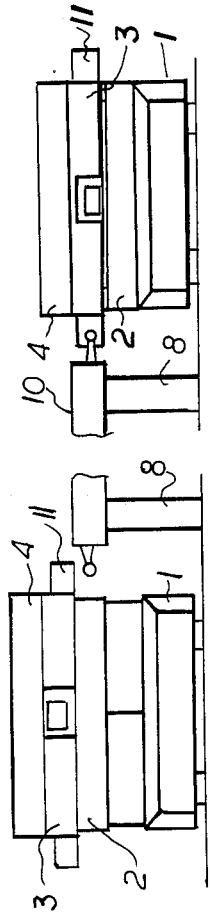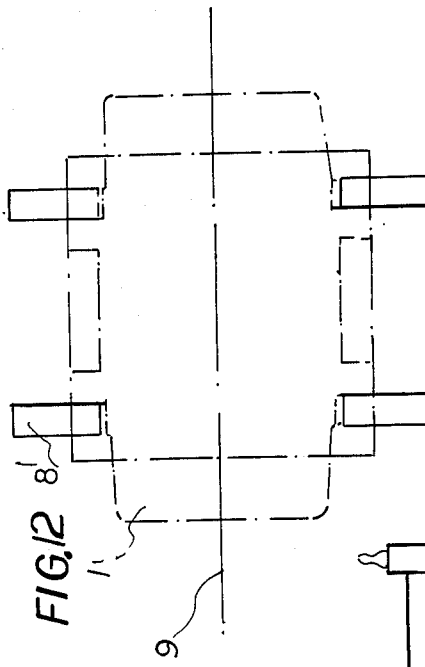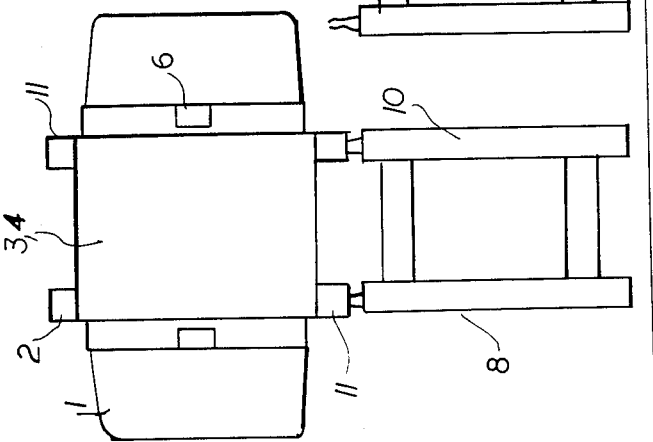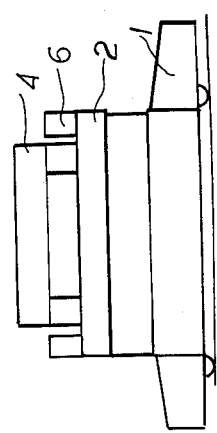

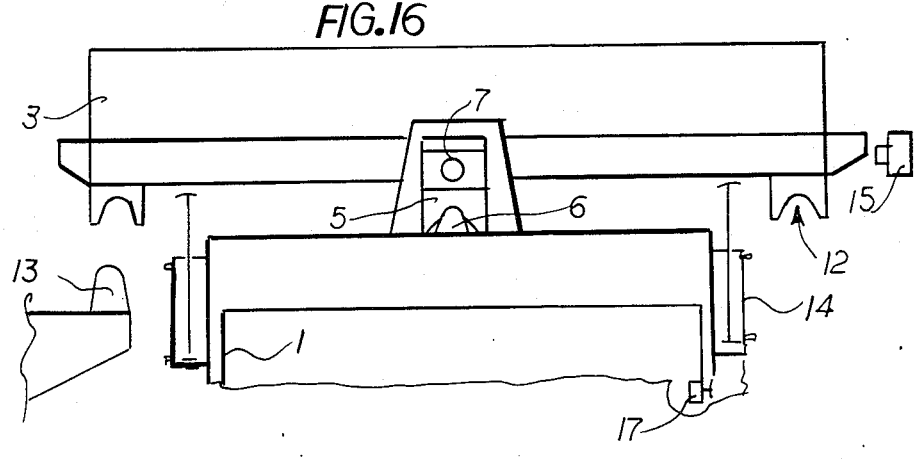
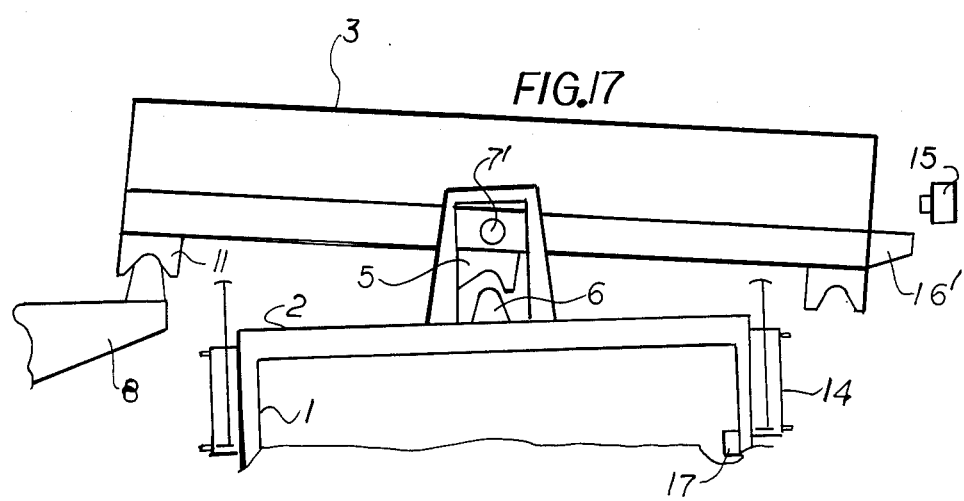
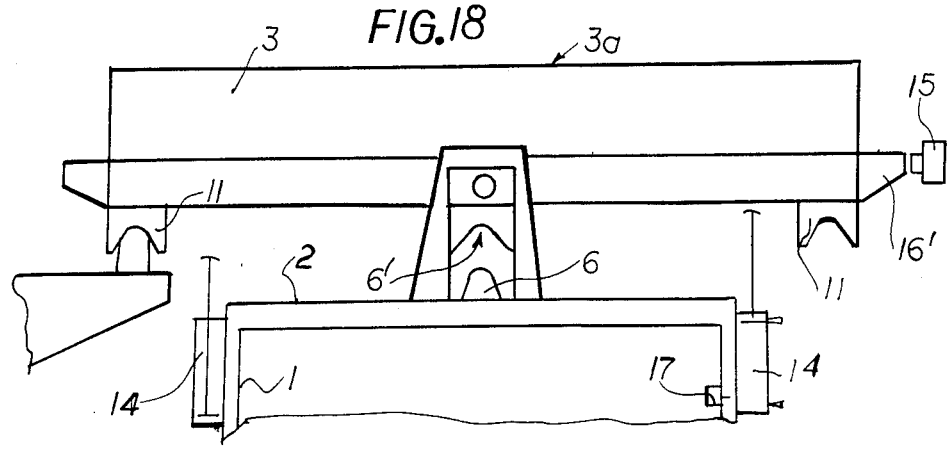

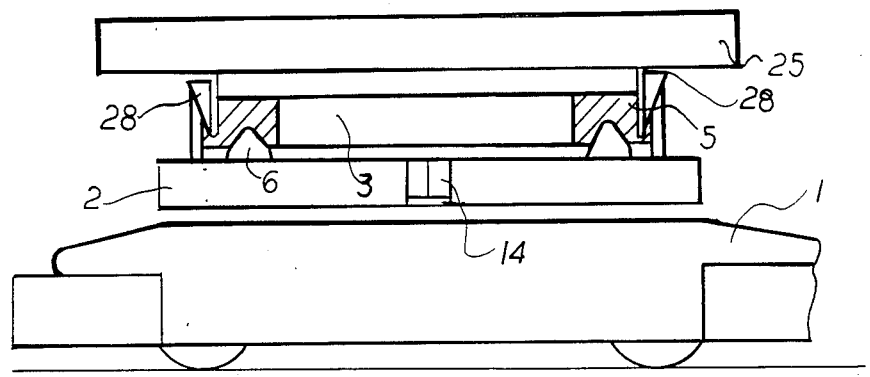
FIG. 22
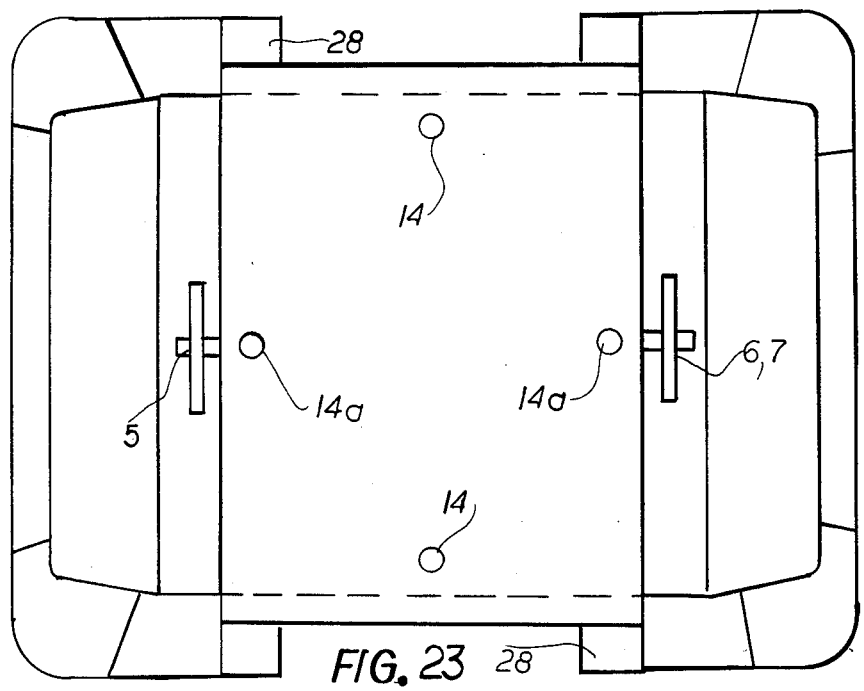
FIG. 23
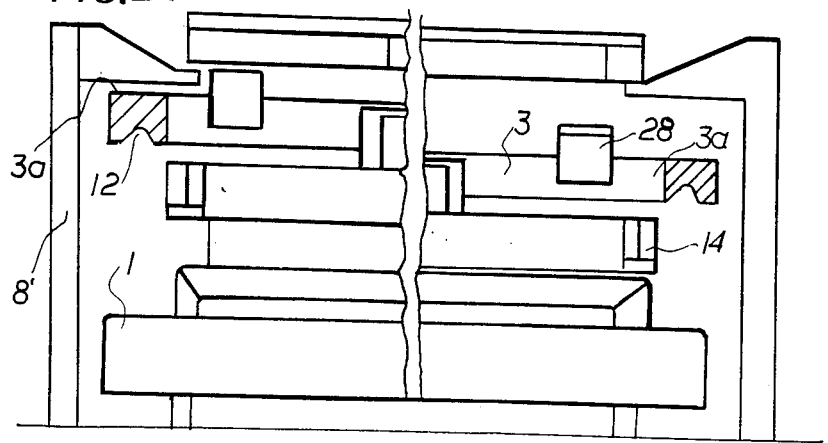
FIG. 24A
FIG. 24B

APPARATUS FOR DOCKING OF A CARRIER ELEMENT FORMING A SUPPORT PLANE ONTO A STATIONARY SUPPORT PLANE

CROSS REFERENCE TO RELATED APPLICATIONS

This application is a national phase application of PCT/EP85/00628 filed Nov. 19, 1985 under the Patent Cooperation Treaty and based, in turn, upon applications P No. 34 43 409.7 of Nov. 28, 1984, P No. 35 02 158 filed Jan. 23, 1985 and P No. 35 04 929.4 filed Feb. 13, 1985 in the Federal Republic of Germany under the International Convention.

FIELD OF THE INVENTION

The present invention relates to docking, that is for the accurate positioning of a carrier element or the like, placed liftably upon a transport carrier or similar transport means forming a support plane, relative to a stationary support plane, e.g. in the stand of a processing or assembly station or a storage place serving as a deposit place for the purpose of transferring objects.

BACKGROUND OF THE INVENTION

The positioning of a carrier element implemented as a plate is already described in DE-OS No. 33 45 877. The carrier plate shown there has the task of forming a support plane upon the transport carriage for an object to be transported, for exemple a workpiece or a pallet upon which the work piece is already located in a certain fashion. The carrier element need not be a plate. In general it can be formed by a suitable stand or the like which has at least three support points, by which a plane is defined.

A possible can be a frame which is formed by two girders or rails connected to one another via two transverse struts, whose surface lies in a common plane and serves as a support for pallets or the like. The necessity for such accurate positioning of the carrier element and its support plane on the transport carriage arises particularly in connection with pallet transport and transfer means in automatic processing systems, as are known, by way of example, from DE-PS No. 31 01 661 or the DE-GM No. 78 35 449.

Here, the pallets with the work pieces are to be transported back and forth by the transport carriage and transferred between an assembly and a processing station, and/or a storage station. The transfer can take place by means of the drive or transport and guidance means described there. The support plane of the of the carrier element on the lifting means of the transport carriage can be brought into the position required for the transfer of the objects, e.g. workpieces or pallets, only with a limited accuracy of about plus/minus 25 mm.

In many cases this does not suffice for the attainment of the desired machining accuracy of the objects or the workpieces on the pallets. The means which have previously been developed for the adjustment of the support plane of the carrier element forming the support plane of the lifting device (DE-OS No. 33 45 877) require an additional stand ahead of the processing station, are extensive, and require additional space for the approach of the transport carriage to the station.

OBJECT OF THE INVENTION

It is the object of the invention to provide a simpler, less complex means for the adjustment by means of docking, that is for the accurate, automatic spatial positioning, of the carrier element on the lifting device with the least possible space requirement. At the same time, the possibility, so advantageous in transport carriages with lifting devices, of reaching under and lifting a pallet resting upon a stand (or conversely to deposit the pallet upon a stand by lowering) should be retained. Above all, however, by means of positioning according to the invention, should ensure that the support plane for the transfer and acceptance of pallets or other objects formed by the carrier plane, abutting the stationary machine stand of the station in question, shall come to lie in exactly the plane common to both support planes, in fact in a place within this plane fixed with respect to the stationary support plane of the stand.

SUMMARY OF THE INVENTION

This object is achieved in accordance with the invention in that, after the approach to the stationary support plane, the carrier element is lowered from a raised position and is supported on the side facing the support plane, and is guided into exact geometrical relationship, on two stationary support points which lie on a straight line parallel to the stationary support plane, but naturally at a distance which takes into consideration the shape, thickness and extent of the supported portions of the carrier element, so that the carrier elemenet can then be lifted on its opposite edge, preferably on a point on the opposite edge area, so far that its support plane lies in the same common plane as the stationary support plane.

Naturally, under this procedure according to the invention, exactly the same position can be attained in two planes parallel to each other. By these measures, the carrier element and its support plane are fixed within the common transfer plane in the desired position.

With the first step of this procedure, there occurs, after the approach of the carriage to the transfer point, a primary adjustment of the plate in both horizontal directions in the desired place in space defined by the two support points as will become evident from the description below.

The the support, guided in exact geometerical relationtionship, pivots about an axis parallel to the stationary support plane, e.g. by means of locating spheres or the like, and plays an important role. With the second step, which one can call a secondary adjustment, there occurs the alignment of the carrier element in the vertical. The support plane of the carrier element is then pivoted about a straight line parallel to the stationary support plane (which in the extreme case may lie in the plane). Thus both support planes, the fixed and the movable one of the carrier element, come two lie in the same plane or in to planes parallel to each other, so that a common section through both planes results in a straight line.

After transfer of the pallet from the stationary support plane to the support plane of the carrier element thus positioned or vice versa, the latter can then be lifted again and taken away.

An apparaus for carrying out the process of the invention comprises a transport means in form of a rail-bound or inductively guided carriage or the like for the transportation or transfer of objects, particularly pallets, and a support plane located on a stationary stand. The carriage has a lifting device, upon which a carrier element is located. The carriage element has an upper surface which forms a support plane, e.g. a plate or a frame, supported detachably by means of support blocks or the like on opposite sides. According to the invention, the apparatus is characterized by the fact that it is fixed in its position upon the carrier element of the lifting device but is detachable by lifting. On the stand in the region facing the carriage and on the carrier element on the side facing the carrier, each, there are two locating lugs equidistant from one another, which mate upon lowering of the carrier element with geometric accuracy and have locating elements upon which the carrier element is supported pivotably about an axis lying parallel to the support plane of the stand. In the region of the edge of the carrier element opposite the locating lugs a lifting element lifting this edge is provided. By means of a control arrangement, this lifting element can be switched on for lowering of the carrier element upon the stationary locating lugs, and switched off after raising of the support plane of the carrier element into a desired position.

By switching on the lifting element the carrier plate is thus pivoted about the above-mentioned straight line of the stationary locating lugs as axis, until its support plane corresponds exactly to the plane of the staionary support plane in the stand.

The special characteristic as opposed to previously known arrangements is that here, the carrier element when being lowered is supported only on one side by a stationary support, namely the above-mentioned stationary locating lugs of the stand, where the recesses of one set of the locating elements mate in exact geometrical relationship with the locating elements of the other set.

On its other side however it is supported by an element connected to the carriage, namely the lifting device.

In a preferred construction of the device, the one pair of locating lugs associated with one support plane has preferably spherical surfaces as locating elements, whose sphere centers lie on an axis parallel to this support plane, while the other pair of lugs has recesses in the shape of circular cones or spherical caps, whose corresponding points, e.g. the points of the several cones, likewise lie on a straight line or axis parallel to the other support plane.

According to a feature of the invention, the carrier element on its rims not facing the the stand is provided with a respective support lug mating with and supportable by each support lug provided on the lifting device, where one of the mating support lugs has preferably the shape of a spherical surface, and the other a circularly conical or spherical cap recess, which when mated surrounds the spherical surface in exact geometrical relationship, but is easily detachable therefrom when lifted.

With such arrangement, the procedure according to invention can easily be carried out by lowering of the carrier element, so that the recesses in the shape of circular cones or spherical caps of the locating lugs meet the locating spheres, and by energizing of the lifting element until the planes are in agreement.

Within the framework of the invention, the lifting element on the opposite side of the carrier element can be omitted, and this edge can be raised by means of the above-mentioned lifting device. However, a lessened accuracy is to be expected in this case than with a smaller exactly controllable lifting element by which a point-shaped support of the carrier element or its support plane can be attained in this edge area. Inaccuracies due to wheel wear of the carriage or unevenness of the floor are not possible with this invention.

There are various possible forms for the locating elements. However, the spherical shape on the one side and the spherical cap or circular cone on the other of corresponding locating or support lugs have proven to be the most advantageous. It will also be advantageous when the lower locating or support lugs exhibit the spherical surface, because in the other case dirt and/or moisture can accumulate in the recesses. In the simplest embodiment, the lower support and locating lugs can be vertical pins having spherical surface, upon which rests the carrier element with appropriate recesses in the corresponding lugs. The angle of acceptance in the circular cone or spherical cap recesses can vary over a wide range. An angle of 45° has proven to be advantageous.

The invention facilitates also simpler embodiments of the locating elements on the locating lugs, by which a pivotable support of the carrier elements can also be attained.

In an advantageous embodiment of the invention the locating elements on the one side are prisms with edges recessed in the shape of a V, and on the other side a double conical roller whose axis runs transverse to the plane of the V-shaped recess. A somewhat simpler structure results when the locating elements on both sides are prisms with edges notched in shape of a V, where the plane of the V-shaped recess on the one side is oriented at a right angle to the one on the other side.

Pins can be provided as locating elements to engage in receptacles formed by three downwardly facing triangular or trapezoidal surfaces in the interior of a tetrahedron, so that the pins locate themselves in the receptacles upon being lowered.

Thus, the above-mentioned variegated shapes of locating elements can be provided on the carrier element as well as in the area of the stand, that is they are interchangeable.

Depending on the use, the arrangement of the lifting element between carrier element and lifting device can vary. Thus the lift element can be a pneumatic or hydraulic lift motor attached with its cylinder to the carrier element, and can have its piston acting upon the lifting device. In another embodiment, the cylinder can be connected to the lifting device, while the piston of the lifting element acts upon the carrier element, or attaches there to the piston rod. In order to permit the transport carriage to approach stations from either side, the invention envisions in an advantageous embodiment that there are locating lugs and one each lifting element on both sides of the carrier element. A leadscrew drive may also serve as the lifting element.

The control means can have at least one switch to de-energize the lifting element, the switch being actuated by the cooperation of a stationary contact element, and one that is connected to the carrier element, as soon as the carrier element has attained its nominal position. In the simplest case, one contact element is immediately a part of the switch itself.

Thus, in a simple embodiment of the control arrangement, the switch, together with one contact element, is provided on one locating lug of the carrier element and is operable by a contact pin placed fixedly in the area of the locating lug. In another embodiment, the switch can be actuated by a switch lever journaled pivotably on an axis in the area above a locating lug of the carrier element. The switch lever is movable against the switch in opposition to a spring force by means of a stationary contact pin.

A simple embodiment makes use of a liquid level switch which operates according to the known principle of the spirit level. With such a switch, e.g. a mercury switch, it is known that a criterion can be derived for the condition where the support plane of the carrier element lies in a horizontal plane.

If one particularly utilizes two contact pins, then one can also derive a criterion for the energization and de-energization of the lifting element due to their differential immersion in the liquid when the switch is in a skewed position. This requires, however, that the support plane of the stand is oriented in the same horizontal position, or is aligned by means of a spirit level or the like.

In order that upon subsequent raising and removal of the carrier element, the latter or its support plane does skew upon the lifting it is recommended, within the framework of the invention, that further controllable lifting or support elements can be provided, acting upon its underside, so that during transportation, the carrier element or its support plane can be retained in a desired position.

BRIEF DESCRIPTION OF THE DRAWING

In the drawing:

FIGS. 1 to 3 show is a side view of a carriage in accordance with the invention, with a carrier element realized as a plate;

FIG. 2 is a top view of the carriage;

FIGS. 7 to 10 show the position of the carriage with the carrier element and the stand relative to one another during transfer of the pallet;

FIGS. 11 and 12 show the approach underneath the pallet by the carriage, for the purpose of lifting it;

FIGS. 16 to 18 show a further variation to the embodiment of FIGS. 4 to 6, with a simplified control device;

FIG. 22 is a side view of a carriage with a carrier element adapted also for the transportation of wooden pallets; and FIG. 23 is a top view of the latter carriage;

FIGS. 24A and 24B are front elevational views, partly broken away, showing the carrier element in two different positions;

SPECIFIC DESCRIPTION

Figure 1:
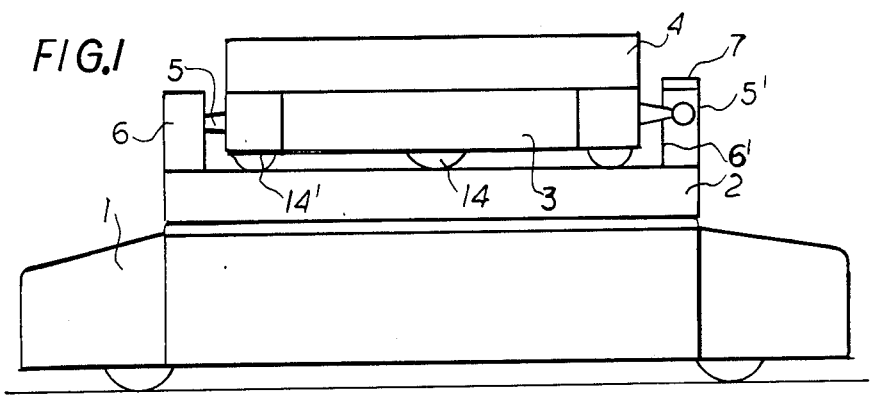
Figure 2:
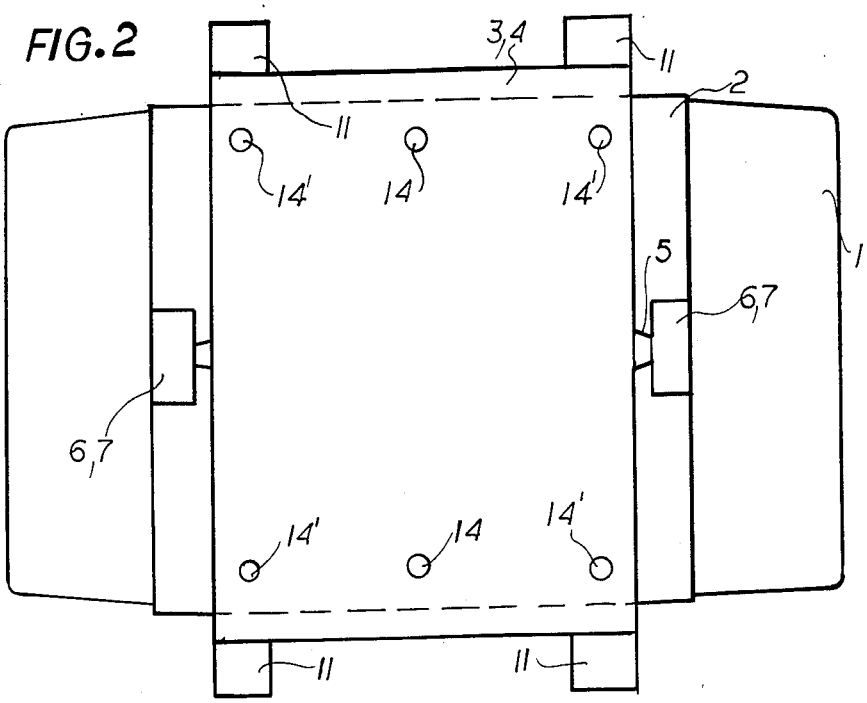
Figures 3A, 3B:
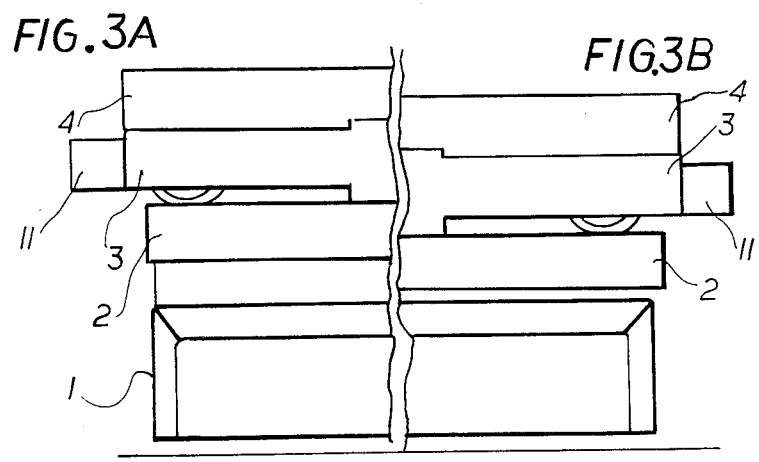
FIGS. 3A and 3B are front elevational views of the assembly in two different positions.

According to FIGS. 1, 2, 3A and 3B, upon a carriage 1 a lifting device 2 is provided with an extended cover plate, upon which lies a carrier element 3 formed as a plate. On the plate 3 lies a pallet 4 of known construction. The carrier element 3 is fixed upon lifting device 2 during transportation in its position by means of sideways protruding trunnions 5 which on their end have spherical surfaces 5' resting in the circularly conical recesses 6' in the support blocks 6 provided upon lifting device 2. The frontal elevation of the carriage 1 in accordance with FIG. 3A shows the pallet 4 in raised and in FIG. 3B in a lowered condition.

According to FIGS. 7 and 8, the carriage 1 runs along several storage or assembly or processing stations, of which in FIG. 8 only the stands 8 for the support of the pallets are shown, in the direction of line 9 upon a guidance which is either railbound or inductive and which is not shown in detail.

Figure 4:
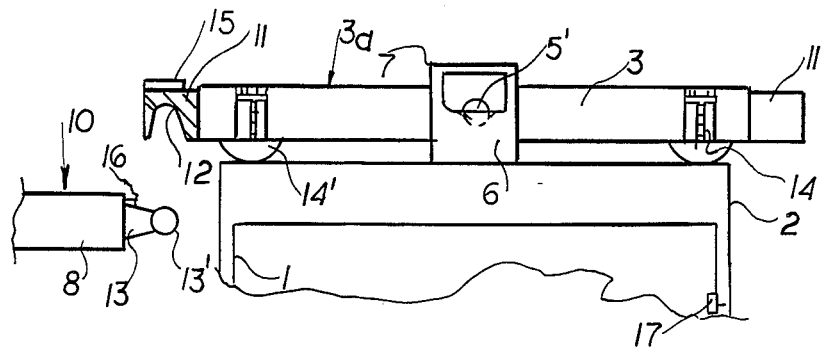
FIGS. 4 to 6 show the various phases of the docking or the positioning procedure of the carrier element and its support plane on a stand.

For the transfer of a pallet onto the support plane 10 of a stand 8 the carriage 1 with carrier element 3 lifted by means of lifting device 2 and pallet 4 approaches the given stand (FIGS. 4, 8 and 9).

The locating lugs 11 provided on the edge of carrier element 3 which face stand 8 with their recesses 12 shaped as spherical caps facing downwards are brought to rest upon the correspondingly arranged spherical surfaces 13' of the locating lugs 13 (FIG. 4) upon stand 8 by lowering.

The centers of the spherical surfaces 13' lie in a straight line parallel to the support plane 10.

Figure 5:
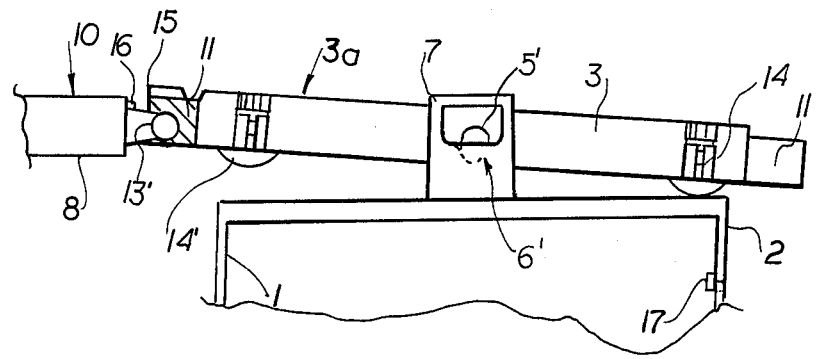

Due to the lowering of lifting device 2 the locating lugs 11 with their recesses 12 extend over these spherical surfaces 13' of locating lugs 13, so that carrier element 3 orients itself accordingly and, due to the lowering, assumes a skewed position (FIG. 5).

The spherical surfaces 5' of the locating lugs 5 on carrier element 3 are forcedly freed from their circularly conical recess 6' on locating lug 6, so that due to the weight of the carrier element, there occurs a forced positioning of the carrier element on the locating lugs 13 in elevation as well as in longitudinal and transverse direction.

By energizing a lifting element 14 on the underside of the carrier element 3 on the edge facing stand 8, the carrier element is lifted to the extent that its support plane 3a finally comes to lie in the same plane as support plane 10 of the stationary stand 8.

The energization of the lifting element 14 occurs here by means of a switch 17 provided on the carriage, which is operated by the lifting device 2 as it drops. The final positioning of the carrier element 3 and thereby of its support plane 3a occurs by means of a switch 15 provided on one or both locating lugs 11 located at a certain distance above the spherical surfaces 13' of the locating lugs 13, which is actuated by means of a stationary pin 16, which is positioned on the stand at the same height as switch 15. After the carrier element 3 is thus fixed, supported on three points, with its support plane 3a in a plane congruent with support surface 10 on stand 8, the transfer of pallet 4 can take place. The drive, transport and guide elements necessary for the pallet are known, and therefore not further described here.

Subsequently, the carrier element 3 is again lifted by means of lifting element 2, and is removed. In order to then maintain the carrier element 3 and its support plane 3a in a horziontal position, further lifting elements 14 operating from below are provided on its corners. In the examples shown locating lugs 11 are provided on both oppositely situated sides of the carrier element 3, so that corresponding stations can be approached on both sides of the carriage.

As can be seen in FIGS. 11 and 12, the carriage 1 with the carrier elements 3 implemented in accordance with the invention can be used to be driven below a pallet 4' or the like positioned upon a further stand 8 to lift it.

Figure 6:
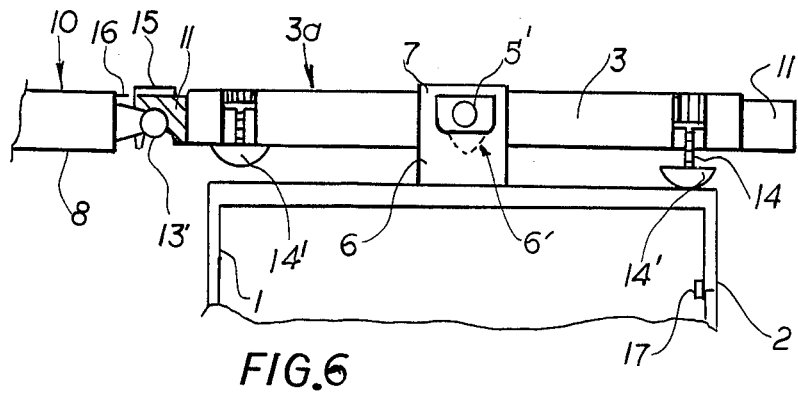
Figure 13:
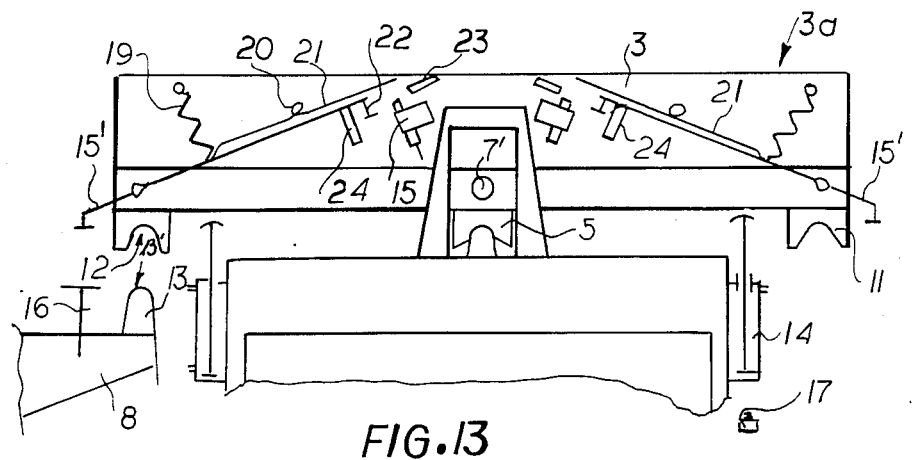
FIGS. 13 to 15 show a variation to the embodiment according to FIGS. 4 to 6, with a separate control device.
Figure 14:
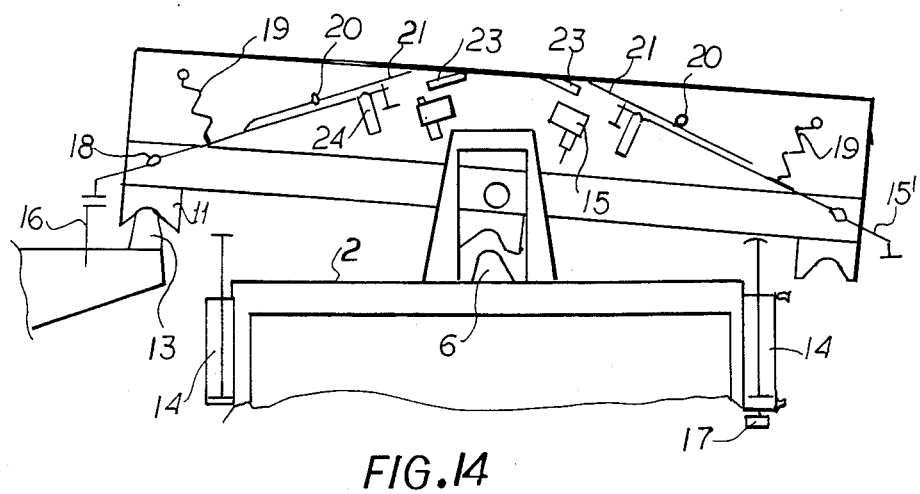
Figure 15:
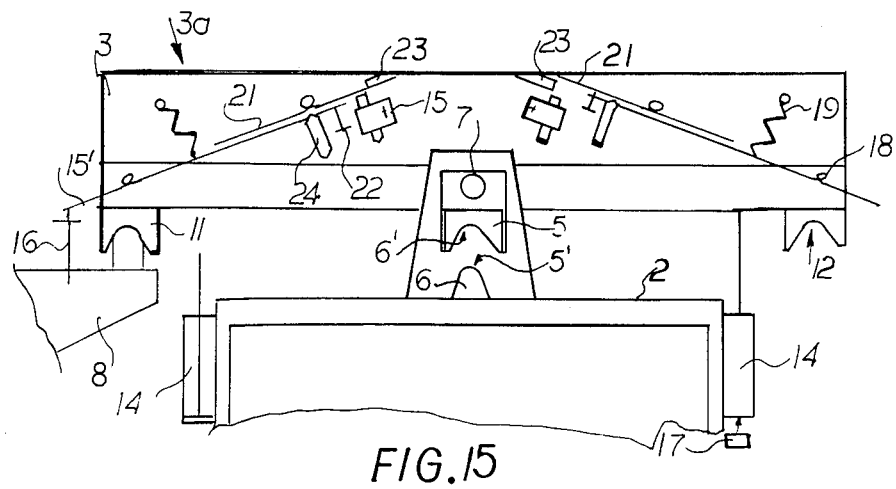

The embodiment of FIGS. 13 to 15 deviates somewhat from the embodiment according to FIGS. 4 to 6. In order to make the commonality with the latter more easily recognizable, corresponding elements are, however, designated with the same reference numbers. In contrast to the former embodiment the spherical surface 5' is provided in the support lug 6 of the lifting device, realized as a pivot, while the conical recess 6' is positioned on support lug 5 of carrier element 3. A cap 7 provided on lifting device 2 prevents, in cooperation with a locking pin 7' on carrier element 3, the removal of the latter from the lifting device, while the same purpose was accomplished in the previous implementation already by support lug 5. Likewise, on stand 8, of which only the lower part is shown and without support plane, the locating lugs 13 are fashioned as vertical pins which on their upperend exhibit the spherical surface 13 . Here too, the carrier element 3 has locating lugs 11 on both sides. Furthermore, lifting elements 14 are are shown on both sides.

These lifting elements 14, also realized as pneumatic or hydraulic lifting motors are, in this example of implementation, arranged fixedly with their cylinders on both sides of lifting device 2, while their pistons or their piston rods are attached to carrier element 3, that is lift it. Upon approach to the stand, the carrier element 3 first rests on the lifting elements (FIG. 13). Upon arrival at stand 8 the carrier element 3 is lowered by a lifting device 2. While it supports itself on lugs 13, it assumes a skewed position (FIG. 14). Finally, switch 17 is actuated by the lowering of the lifting device via lifting element 14, whereby this lifting element is energized and lifts the carrier element 3. In this example, the switch 17 is located fixedly on the side of the lifting device 2 lying opposite stand 8 below the corresponding lifting element 14.

Simultaneously with the energization of lifting element 14 via the switch 17, a control device provided on both sides of the carrier element is activated.

A switch lever 15' is journaled pivotably about axle 18 above locating lug 11. When no other force acts upon it, it is urged onto stop 20 by a spring 19. It has a contact spring 21, which can be adjusted to the desired position in relation to the lever by means of adjusting screw 22. By energization of the lifting element 14 (FIG. 14), the carrier element 3 is raised. The end of switch lever 15 away from contact spring 21 meets the contact pin 16 on stand 8.

Upon further lifting of carrier element 3 by means of the lifting element 14, the switch lever 15' is pivoted towards switch 15. By means of the adjusting screw 22, the contact spring 21 is so positioned that by it the switch 15 is activated at the moment when the support plane 3a of the carrier element 3 has attained its nominal position, thus is in exact congruence with the support plane 10, not shown here further, of stand 8 in the common plane (FIG. 15). Suitably the switch 15 is implemented here as a so-called non-contacting switch. An auxiliary switch, not absolutely necessary here, is designated by 23, which introduces here a speed reduction of the hydraulic drive of lifting element 14, in order to avoid overshooting due to insufficient braking of the piston motion. Furthermore, an emergency switch 24 is also provided which in case of malfunction of switch 15 deenergizes the lifting element 14.

The implementation according to FIGS. 16 to 18 deals with the same positioning events. Control is exercised here only by a switch 15, arranged in stationary manner always on the side opposite that of switch 15 positioned on the stand, which is first inactive during the lowering of the carrier element (FIG. 16) and is only activated by operation of switch 17, even when the lifting element 14 is energized. If switch 17 is fastened immediately to the carriage 1, as in this example of implementation, then obviously care must be taken by a suitable control that in every instance the correct lifting element 14 always located on the opposite side of stand 8, is energized.

The carrier element 3 has here a nose 16' providing sideways on the side facing switch 15. Upon raising of the carrier element by means of the lifting element 14 (FIG. 17) this nose is moved towards the contact element of switch 15. When the carrier element 3 has attained its nominal position (FIG. 18, then the nose 16' actuates as contact element switch 15, which thereby deenergizes lifting element 14.

Figure 19:
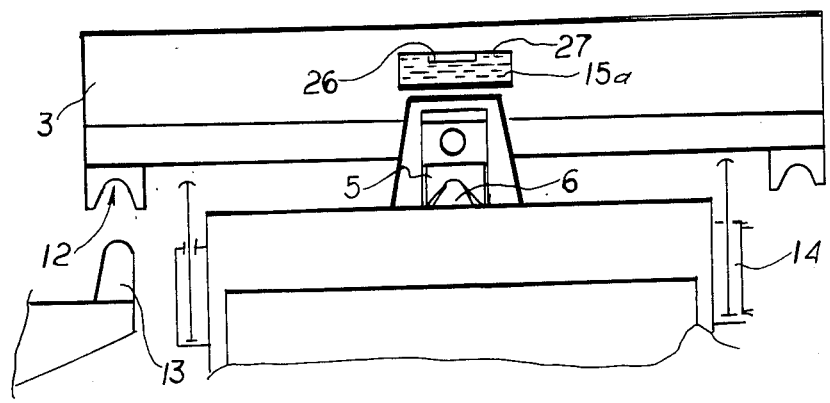
FIGS. 19 to 21 show a variation to the embodiment of FIGS. 4 to 6 with a liquid level switch.
Figure 20:
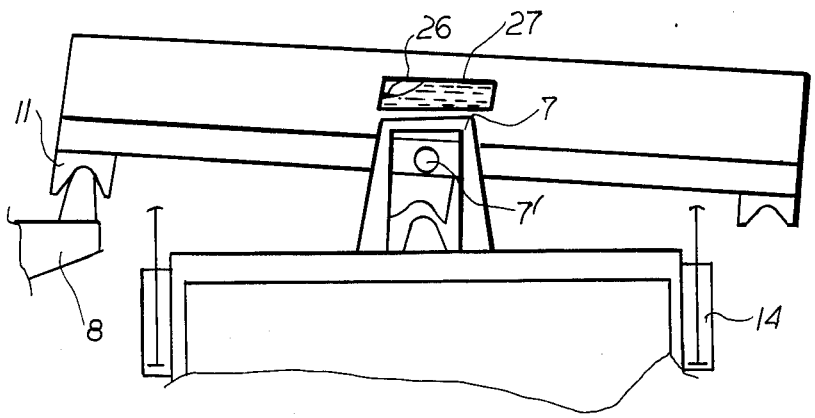
Figure 21:
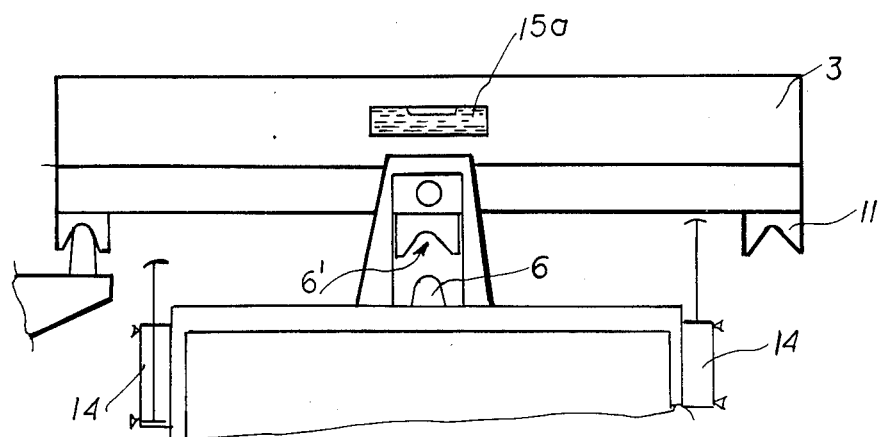

In the embodiment of FIGS. 19 to 21, a liquid level switch 15a is connected with the carrier elemen 3. Two contact pins 26, 27 are wetted by the liquid in differential manner upon lowering of the carrier element and thus energize lifting element 14 (FIG. 20), until again carrier element 3 has attained its nominal position (FIG. 21).

In the example of embodiment of the transport carriage according to FIGS. 22, 23, 24A and 24B a special feature provides that on both sides of the carrier element 3 special support rests in form of brackets 28 are provided. The transport carriage 1 according to the invention can be moved below wooden pallets, in on a rest stand 8', and that the pallets can be lifted from it or lowered onto it. The brackets or support rests 28 can be equipped with positioning means. They protrude upwards beyond the support plane 3a of the carrier element 3 and thus form an elevated support plane. Thus, moving the carriage underneath the rest stand 8 is facilitated.

During transport, the carrier element 3 rests on both lifting elements 14, as well as the support elememts 14a provided on the sides in FIG. 23. These support elements 14a are not shown in the other Figures. They serve as support for the pallet during transportation.

Figure 25:
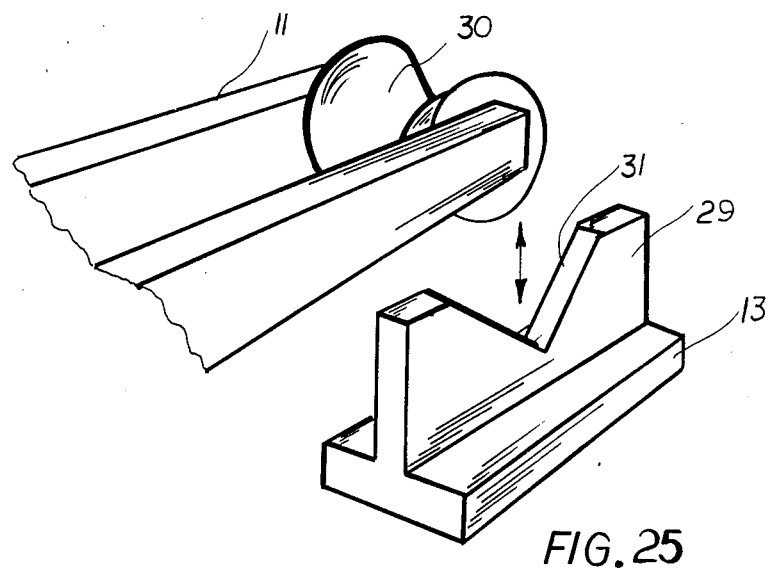
FIGS. 25 to 30 show various embodiments of locating elements.
Figure 26:
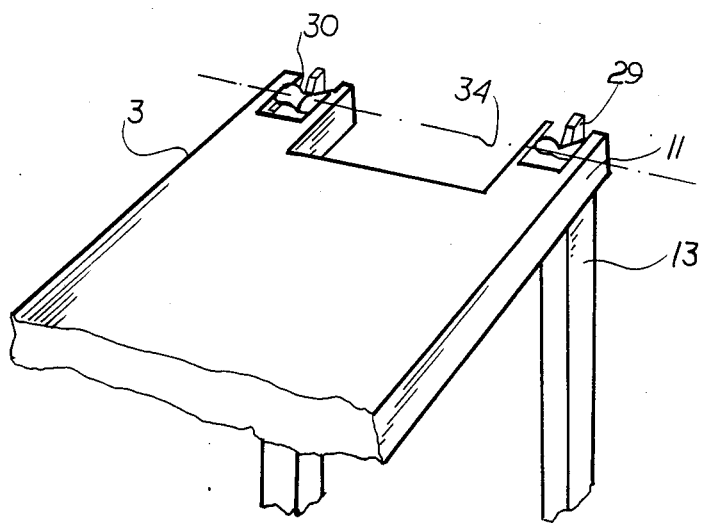

In lieu of the recess 12 and the spherical surface 13', the following Figures show an implementation of the locating lugs 11 and 13 with significantly simpler locating elements. In the example of FIGS. 25 and 26, the single centering lug 11 is provided with a dual conical roller 30, while the corresponding centering lug 13 of the stand has as locating element, aprism 29 with an approximately V-shaped recess 31 for the acceptance of a dual conical roller 30. As can be seen from FIG. 26, these locating devices make it possible to pivot the carrier element 3 about a common axis 34 running through both locating elements of the mated locating lugs 11 and 13.

Figure 27:
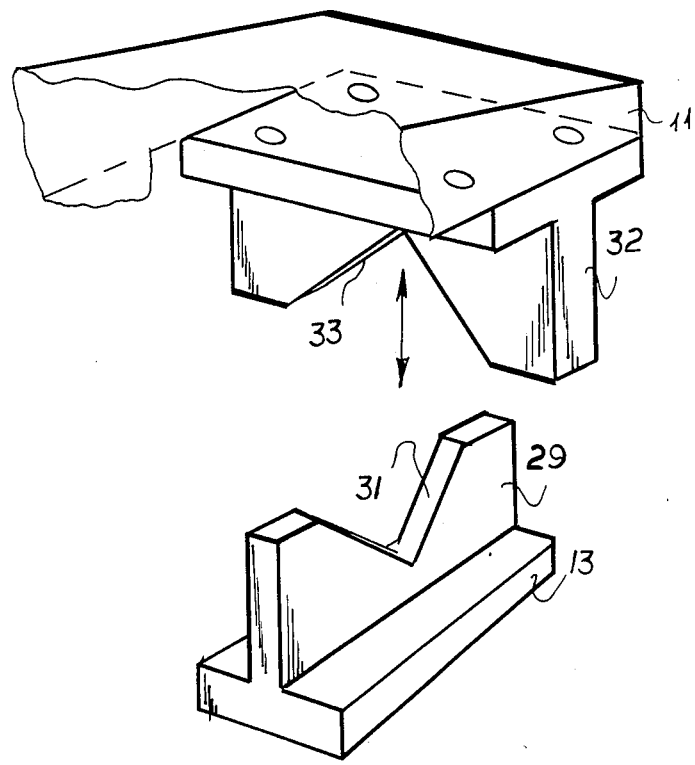
Figure 28:
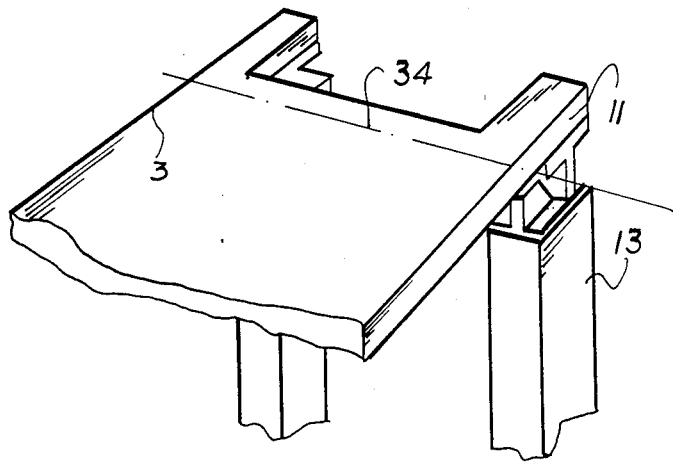

An even simpler construction results when locating lug 11, in lieu of the dual conical roller likewise exhibits a prism 32 with a V-shaped recess 33, which however with the plane defined by the V-shaped recess 33 is oriented at right angles to the corresponding plane of prism 29 on locating lug 13 (FIGS. 27 and 28). The locating means also permit the pivoting of the mated locating lugs 11 and 13 relative to each other about a common axis 34 running through the locating elements, and thus pivoting of the carrier element 3 with respect to the stand.

Figure 29:
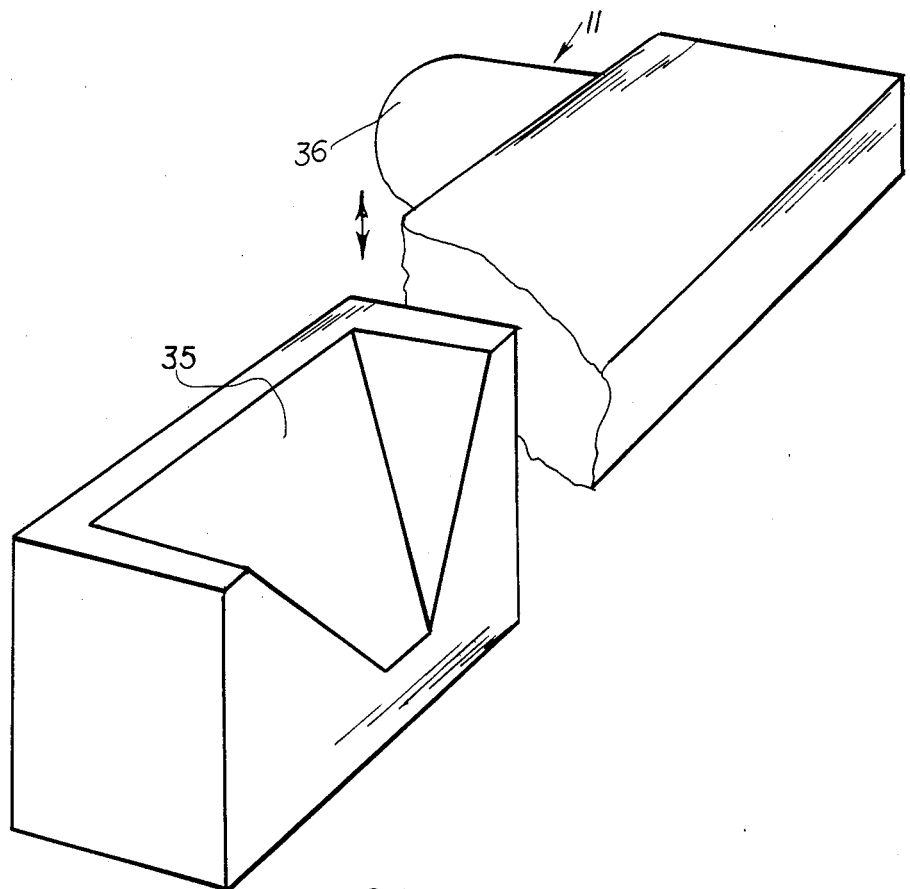
Figure 30:
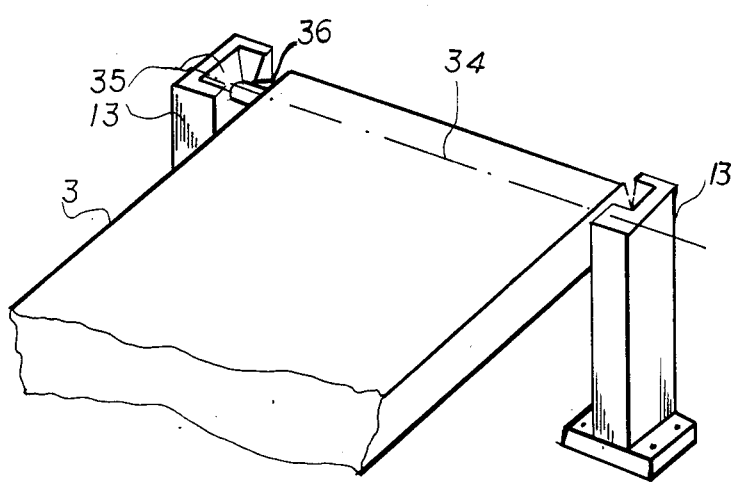

A further, simple embodiment is shown in FIGS. 29 and 30. Here the locating lugs are provided as preferrably cylindrical trunnions 36, which upon lowering of the carrier element each engage one receptacle 35 provided on the stand-side locating lugs 13. In the example, the receptacle is formed by downward slanted triangular and trapezoidal surfaces to the sides and the face of trunnion 36, which act approximately as the inner surfaces of a tetrahedron and locate the trunnion accurately, so that the carrier element 3, as shown in FIG. 30, is pivotable about an axis 34 formed by the trunnions 35 journaled in receptacles 35 of the stationary locating lugs 13.

The desired coplanar position of the two planes is also accomplished with these much simpler locating means, since in these examples too the pivot axis 34, is oriented in the desired position parallel to the support plane of the stand, not shown here.

I claim:

1. An apparatus for the transfer of pallets, comprising:
   a carriage guided along a path;
   a platform vertically shiftable on said carriage;
   a pallet carrier mounted on said platform and defining a support plane for a pallet;
   means on said platform for retaining said pallet carrier thereon against movement parallel to said plane but enabling tilting movement of said pallet carrier relative to said carriage about an axis parallel to said support plane, said pallet carrier being formed with a pair of spaced-apart downwardly turned self-centering formations at least along one edge of said pallet carrier;
   a station disposed along said path and formed with a pallet receiver having a support plane for a pallet to be received from said pallet carrier or transferred thereto, said pallet receiver being provided along an edge thereof with a pair of self-centering formations respectively corresponding and complementary to the said formations of said pallet carrier;
   means on said carriage for raising and lowering said platform with said pallet carrier thereon so that upon lifting of the formations of said pallet carrier above said formations of said pallet receiver said formations of said pallet carrier and said pallet receiver are coupled by lowering of said pallet carrier whereby said pallet carrier is tilted relative to said platform; and
   further means effective between said platform and said pallet carrier while said formations of said pallet carrier and said pallet receiver are coupled, to reorient said pallet carrier so that said support planes are coplanar, thereby permitting transfer of a pallet between one of said support planes and the other of said support planes.

2. The apparatus defined in claim 1 wherein said self-centering formations on said pallet receiver comprises a pair of locating lugs having spherical surfaces as locating elements, whose spherical centers lie on an axis extending parallel to said support plane, and the self-centering formations on said pallet carrier comprise another pair of locating lugs having recesses of a shape of a surface of revolution for receiving the spherical surfaces and with center points lying on an axis parallel to the support plane.

3. The apparatus defined in claim 2 wherein said means for enabling tilting movement of the pallet carrier includes support lugs on opposite edges of the carrier each engaging a support lug provided on the platform, one of the mutually engaged support lugs having the shape of a spherical surface and the other of the mutually engaged support lugs being formed with a recess having the shape of a surface of revolution receiving the respective spherical surface in geometriclly exact manner.

4. The apparatus defined in claim 3 wherein each of the recesses has a mouth with an apex angle of about 45°.

5. The apparatus defined in claim 1 wherein at least one of the complementary formations is a prism with an edge recessed in shape of a V and the other of the complementary prisms is a dual conical roller with an axis running transverse to the V-shaped recess.

6. The apparatus defined in claim 1 wherein one of pairs of formations are trunnions provided as locating elements and the formations complementary thereto are respective receptacles for the trunnions each formed by three surfaces defining the interior surface of a tetrahedron.

7. The apparatus defined in claim 1 wherein said means effective between said platform and said pallet carrier is a fluid-operator lifting motor having a cylinder connected to the carrier and a piston acting against the platform.

8. The apparatus defined in claim 1 wherein said means effective between said platform and said pallet carrier is a fluid-operated lifting motor having a cylinder connected to the platform and a piston acting upon the carrier.

9. The apparatus defined in claim 1, further comprising at least one switch to deenergize the means effective between said platform and said pallet carrier, which can be actuated by the cooperation of a stationary contact element and one connected with the carrier.

10. The apparatus defined in claim 9 wherein the switch is provided on one of the formations on said pallet carrier so that said switch is actuated by a contact pin located stationarily on said station in a region of the locating lug.

11. The apparatus defined in claim 10 wherein the switch is provided with a switch lever pivotably journaled on an axis in a region area above the formations on the pallet carrier, said lever being movable toward said switch by said pin against the force of a spring.

12. The apparatus defined in claim 1, further comprising control means for said pallet carrier including a liquid level switch.

13. The apparatus defined in claim 1 wherein said means on said platform includes a pair of upstanding frames formed on said platform, and within each frame an upwardly extending upwardly tapered rounded-top projection engageable with a downwardly widening recess formed on a downwardly extending projection on said pallet carrier, said formations on said pallet carrier being downwardly widening recesses engageable with upwardly projecting tapered protuberances forming the formations on said station.

14. The apparatus defined in claim 13 wherein said further means includes a piston arrangement on said pallet carrier having a rounded bearing surface resting against said platforms.

* * * * *